June 5, 1973  H. N. HICKS, JR  3,737,285
APPARATUS FOR CRACKING AND RECOVERY OF HYDROCARBONS
Original Filed July 31, 1967  4 Sheets-Sheet 1

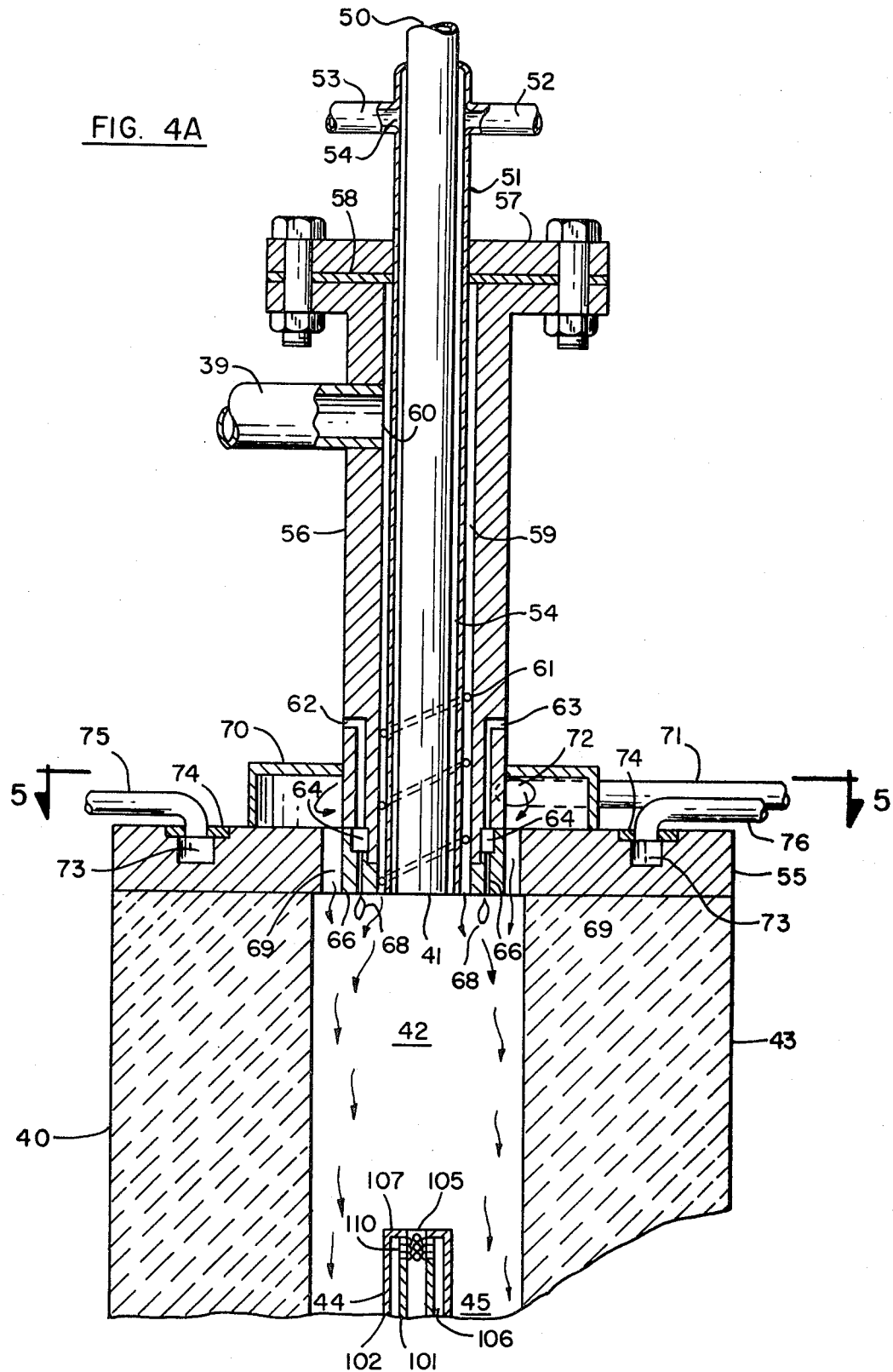

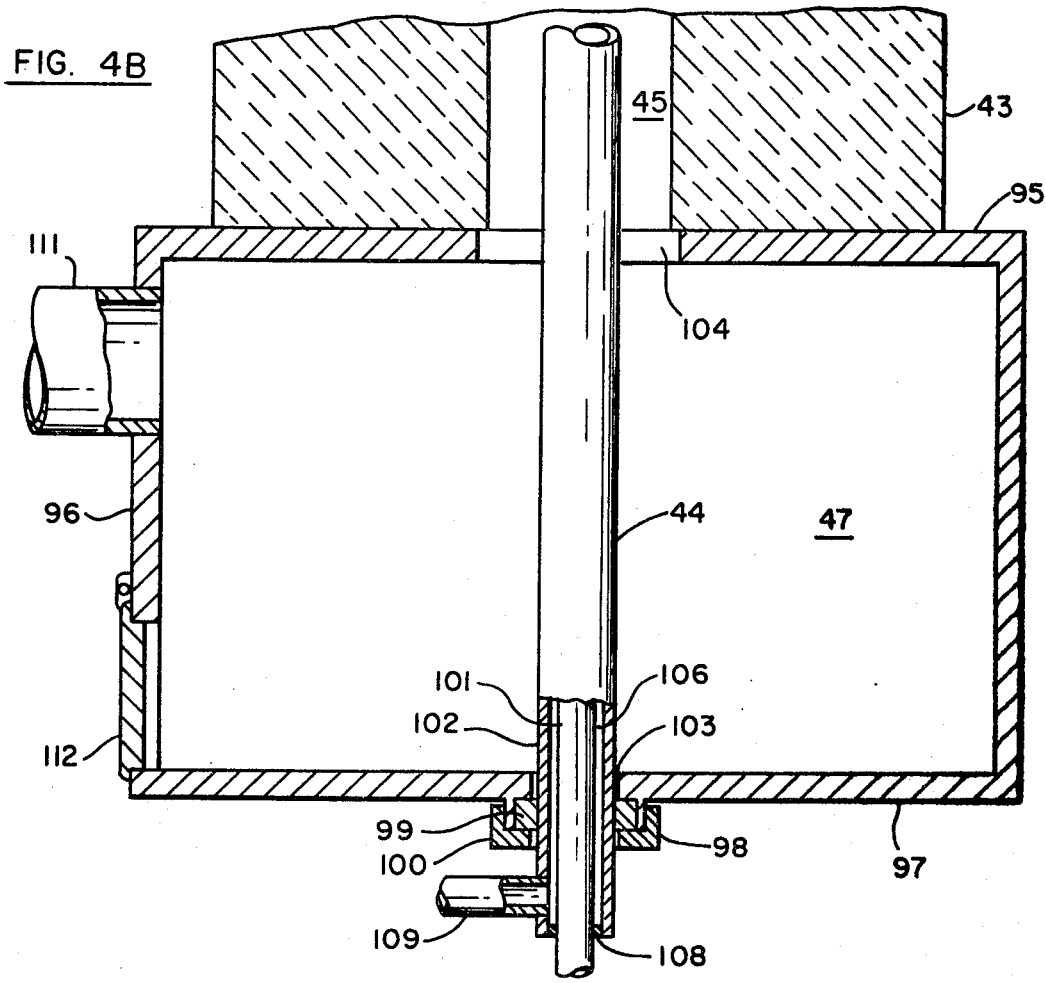
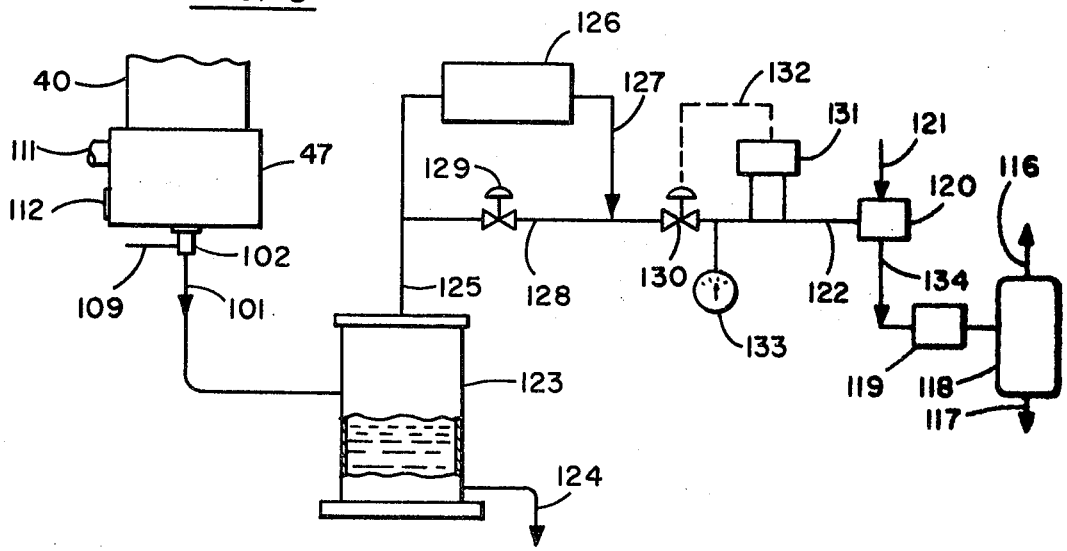

June 5, 1973   H. N. HICKS, JR   3,737,285
APPARATUS FOR CRACKING AND RECOVERY OF HYDROCARBONS
Original Filed July 31, 1967   4 Sheets-Sheet 4

United States Patent Office

3,737,285
Patented June 5, 1973

3,737,285
APPARATUS FOR CRACKING AND RECOVERY
OF HYDROCARBONS
Harold N. Hicks, Jr., Huntington, W. Va., assignor to
Ashland Oil, Inc., Houston, Tex.
Original application July 31, 1967, Ser. No. 657,342, now
Patent No. 3,565,968, dated Feb. 23, 1971. Divided
and this application Oct. 26, 1970, Ser. No. 84,204
Int. Cl. C07c *11/24;* C10g *9/38*
U.S. Cl. 23—277 R   1 Claim

ABSTRACT OF THE DISCLOSURE

This application discloses apparatus for cracking hydrocarbon feedstocks, in which a solid carbonaceous fuel is burned within a cracking zone to supply the temperature and the heat required for the endothermic cracking reaction. A reactor is also disclosed which has in it an eductor tube that is of reduced cross-sectional area with respect to the cracking chamber for preferentially recovering from the interior of the reactor a stream rich in cracked products and lean in combustion products and ash.

---

This is a division of copending application S.N. 657,342 filed July 31, 1967, now U.S. Pat. 3,565,968, issued Feb. 23, 1971. Material appearing in U.S. Pat. 3,565,968, but not included in this specification is incorporated herein by reference.

BACKGROUND OF THE INVENTION

The broad field of the invention is the cracking of hydrocarbons. More particularly the invention relates to apparatus for the production of unsaturated hydrocarbon products by cracking hydrocarbon feedstocks having a higher degree of saturation than the unsaturated hydrocarbon products produced therefrom. In one specific aspect, the invention pertains to apparatus for the production of acetylene and ethylene mixtures.

BRIEF DESCRIPTION OF THE DRAWINGS

In the drawings which accompany this specification, in which uniform reference numerals are employed to identify the same parts when they appear in more than one view, and in which the various parts are not to scale:

FIG. 4A is a sectional view of the upper portion of a burner and cracking chamber assembly which connects with the solid feeding apparatus shown in FIG. 3;

FIG. 4B is a sectional view of the lower portion of the cracking chamber shown in FIG. 4A and the product collection chamber which connects therewith;

FIG. 6 is a diagram of a collection system which is connected to the eductor tube of the cracking chamber shown in FIG. 4B.

Figure 1:
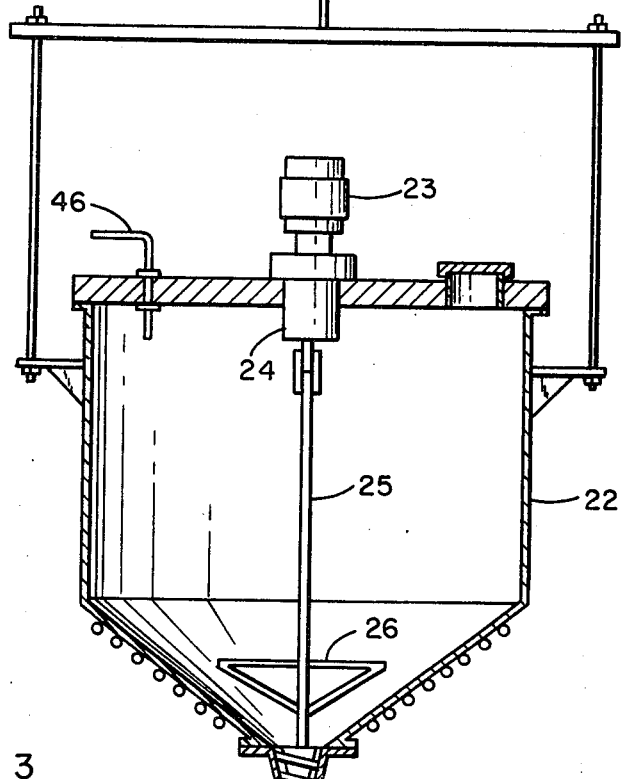
FIG. 1 is the first of seven figures disclosing a portion of a thermal cracking apparatus constituting a preferred embodiment of the apparatus of the present invention, FIG. 1 being a sectional view which shows a solid fuel storage and feeding device for such system.

There is a definite need for improvements in the efficiency of apparatus for cracking hydrocarbons to acetylene and mixtures of acetylene with ethylene, since the growth rate for industrial utilization of ethylene is currently higher than that of acetylene, this trend being due in no small part to the fact that certain chemicals formerly based on acetylene are now being made from ethylene in view of significant reductions which have been realized in the cost of production of the latter material. It is believed, therefore, that there is a need for improvements in the efficiency of producing acetylene if acetylene is to maintain or improve its position as a raw material.

OBJECTS

It is an object of the present invention to fulfill the above-mentioned need. Another object is to provide an apparatus for subjecting a hydrocarbon cracking stock to a time/temperature history which discourages yield losses from unwanted side reactions. For a discussion of time-temperature history the reader is referred to columns 3, 4, 5 and 6 of U.S. Pat. 3,565,968. Yet another object is to provide apparatus for cracking hydrocarbons to acetylene-ethylene mixtures at a low energy cost per pound of product. Still another object is to provide apparatus for cracking hydrocarbons in which the thermal energy required for the endothermic cracking reaction is transferred to the reaction mass in an extremely rapid manner. Another object is to provide a cracking apparatus in which the cracking stock is heated to a very substantial extent by high emissivity, incandescent particles of carbonaceous fuel. Yet another object is to provide apparatus for conducting a cracking reaction with a very high level of thermal efficiency. Still another object of the invention is to provide apparatus for conducting a cracking reaction to produce the desired cracked products at high levels of concentration, thus facilitating their recovery. Yet another object of the invention is to provide apparatus for conducting a cracking reaction while minimizing formation and adherence of undesired deposits in the cracking apparatus. Another object is to provide a cracking apparatus employing a solid carbonaceous fuel as the heat source and in which the fuel is burned in the same chamber in which the cracking reaction takes place, but in which the feedstock and burning fuel are maintained substantially separate from one another. These and other objects of the invention will become apparent to those skilled in the art upon consideration of the following description of the invention and certain preferred embodiments thereof.

SUMMARY STATEMENT ON THE FEATURES OF THE INVENTION

In accordance with certain apparatus aspects of the invention, an improved cracking reactor of the type having fuel, feedstock and oxidant introduction means, a cracking chamber and quenching means, is provided. The cracking chamber of such a reactor is defined by upstream and downstream ends connected by side wall means. The transverse spacing of the wall means may vary from point to point along the length of the reactor, but the side wall means should be free, at least in that portion of the cracking chamber upstream of the quenching means, from abrupt changes in cross-section, from chokelike restrictions and from wall roughness and projections of a character which would bring about thorough turbulent mixing of the feedstock and fuel flowing through the chamber. The length of the cracking chamber may be equal to or less than, but is preferably greater than, its width. The feedstock introducing means is (are) connected with the interior of the chamber through a nozzle means situated at the upstream end of the chamber. The nozzle means include(s) a stream-forming member for forming the feedstock into a stream and projecting it through the chamber along a flow path which extends downstream in the chamber and is spaced inwardly from the side wall means thereof.

In accordance with the improvements provided by the present invention, the aforesaid type of reactor is equipped with a stream-forming member formed and disposed for confining at least the major portion of the feedstock stream to a flow path which occupies less than about half of the transverse cross-sectional area of the cracking chamber along that portion of its length which is upstream of the quench means. Preferably, the stream forming member is a substantially straight run of tubular conduit having a generally circular cross-section and a length to diameter ratio of at least about twenty to one, which terminates in an unrestricted opening at the upstream end of the cracking chamber, said opening being spaced inwardly from the side wall means of the chamber on all sides. Surrounding the feedstock inlet at least in part (and preferably substantially completely) and spaced outwardly therefrom in the first end is (are) means for introducing at a controlled rate a continuous flow of solid carbonaceous fuel into the cracking chamber with components of motion downstream in said chamber and divergent from the general direction of movement of the feedstock stream. Surrounding the fuel inlet means at least in part (and preferably substantially completely) and spaced outwardly from the fuel introducing means is (are) oxidant introducing means for producing an envelope of oxidant surrounding the fuel and for directing the oxidant downstream while keeping it spaced outwardly from at least the major portion of the feedstock stream. Any known means for quenching and recovering the cracked products may be connected with the downstream end of the cracking chamber, but it is preferred to employ the eductor disclosed herein.

The combination of the stream-forming means which confines the feedstock stream as above described and the solid fuel introducing means which imparts to the fuel a component of motion divergent from the direction of the feedstock stream coacts to maintain the feedstock stream and burning fuel substantially separate from one another along that portion of the length of the cracking chamber upstream of the quenching means. That fact that the fuel solids introducing means at least partly surrounds the feedstock introducing means and is between the feedstock and oxidant introducing means tends to shield the feedstock stream from the oxidant and further tends to bring about consumption of most of the oxygen before much inter-diffusion of the feed and oxidant can take place, while in actual practice the feedstock stream on the one hand and the burning fuel and oxidant on the other may not actually continue throughout the entire length of the cracking chamber as substantially completely discrete and physically separated streams, it should be apparent that if all but a small portion, e.g. less than about 20% of each stream is prevented from diffusing into the other, as a result of the abovedescribed features of the reactor, the requirement of keeping the streams "substantially separtae" will be amply fulfilled. The extent of interdiffusion between the streams may be determined by calculation from an off-gas and cracked products analysis using formulae and assumptions familiar to persons skilled in the analysis techniques employed in the cracking art, or may be determined by the use of radioactive tracer elements.

The eductor, which comprises another apparatus aspect of the present invention, is a product withdrawal arrangement. It is applicable to any cracking reactor which, in the course of its operation, has available substantially separate streams of cracked products and combustion products in different but adjacent portions of the same chamber, and is particularly effective in that category of reactor which produces a stream of combustion products which at least partly surrounds a substantially separate stream of cracked products. The reactor discussed above walls in this category. The eductor is a tube of restricted cross-section which is placed in the reactor so as to have one or more inlet parts in the cracking chamber at a chosen point or points where the concentration of cracked products is higher than the concentration of combustion products. Preferably, the chosen point is that point where the cracked products are present at substantially the highest concentration available in the cracking chamber when the reactor is in operation. In a furnace having a circular cylindrical cracking chamber with an axial feedstock nozzle surrounded by annular fuel and oxidant injection means located at its upstream end, the eductor tube is preferably mounted on the longitudinal axis of the chamber, downstream of the feedstock nozzle with its inlet port directed toward the feedstock nozzle to permit direct entry of the cracked products without change of direction. The port and tube are preferably of lesser cross-sectional area than the portion of the cracking chamber in which they are located. The minimum distance between the feedstock nozzle and the eductor tube inlet port is determined by the rate at which the feedstock and resultant cracked products flow through the chamber and the residence time needed to complete the cracking reaction. The maximum distance is determined by the distance over which the feedstock-product stream and the fuel/oxidant-combustion product streams may flow in side-by-side relationship and remain substantially separate. Adjacent the inlet port, in the cracking chamber, and preferably surrounding the port at least in part, is(are) passage means constituting a flow path discrete from that through which the products are withdrawn, for conducting combustion products away from the port. In the tube, preferably closely adjacent the port, are means for introducing quench fluid into the products which depart through the tube. Preferably, means are provided for circulating coolant, which may be quench fluid, within the walls of the tube. The eductor tube is connected with means for producing a controlled negative pressure differential between the interior of the reaction zone proper and the interior of said tube, whereby the cracked products may be recovered in said tube in preference to combustion products and ash.

CONSIDERATIONS RELATING TO MATERIALS, OPERATING DATA AND PRODUCTS

In general, the invention may be carried out with any and all fluidic aliphatic and alicyclic hydrocarbons. "Fluidic" refers to hydrocarbons which may be gaseous, vaporous, liquid or even solid or semi-solid at ambient temperatures, but which are capable, either in their natural state or after suitable pretreatment known to persons skilled in the cracking art (e.g. heating, atomization, dilution, and so forth), of being readily pumped, transferred through conduits and fed to the process as above described, in a fluid condition. It is preferred, however, to use hydrocarbons which may be introduced into the cracking chamber in a gaseous (includes both true gasses and vapors) state. Thus, the term "hydrocarbon," sometimes referred to as "more saturated hydrocarbon," as used throughout the specification and claim, refers to any aliphatic or alicyclic hydrocarbon or mixture of hydrocarbons having a higher hydrogen to carbon ratio than that of the cracked products. Preferably, primarily for economic reasons, the hydrocarbon feed for making mixtures of acetylene and ethylene will consist essentially of one or more of the lower aliphatic saturated hydrocarbons having at least two to about ten carbon atoms per molecule, namely, ethane, propane, butane, isobutane, pentane, hexanes, octanes, nonanes, decanes. Commercial hydrocarbon mixtures derived from petroleum, such as naptha, liquified petroleum gases or refinery by-product gases are also applicable. The process is also applicable to methane, but, in general, to obtain attractive yields of acetylene and ethylene by the process of this invention, it is highly desirable that the feed contain substantial proportions of hydrocarbons higher than methane, especially hydrocarbons in the range of $C_3$ to about $C_{10}$. Of course, heavier feeds may be used, especially if different products are desired.

The carbonaceous fuel may be any finely divided, e.g. about 60 mesh or smaller, combustible, solid, particulate, essentially carbonaceous material, e.g. characterized by a hydrogen content of less than about 15 percent, which is or has been treated to render it substantially "free flowing." Thus, for example, ground hard coal, devolatilized coal and char obtained by low temperature carbonization of coal may be used. It is a feature of the invention that carbonaceous fuels of widely varying ash contents may be employed with economic advantage, but superior performance is obtained when operating with coal having a high ash melting point, e.g. greater than about 3000° F. Such coals are readily available. In addition to the carbonaceous solid fuel mentioned above, supplementary fuel gas may be employed in relatively minor amounts, e.g. in sufficient amounts to supply not more than about 20 percent of the total heating value of the carbonaceous fuel and fuel gas combined. The supplementary fuel gas may be introduced separate from or in admixture with the carbonaceous solid fuel. It would not involve a departure from the spirit of the invention to employ supplementary liquid fuel; however, it will be appreciated that supplementary gaseous fuels are more conveniently handled. Supplementary fuel gas can play an important role in helping to maintain combustion during the warm up phases of reactor operation. However, once steady temperature conditions have been attained, the supplementary fuel gas may be backed out and the reactor may be operated "substantially exclusively" on carbonaceous fuel, e.g. except for a very small gas-fueled pilot light to assist in ignition, only carbonaceous fuel is burned in the reactor.

Any oxygen bearing gas that will readily support combustion may be useful as the oxidant in the process of the invention. In this connection, air has been employed with success. However, it will be appreciated that certain benefits, including a higher concentration of the desired products in the product stream, may be attained when oxygen is present in a higher concentration than is provided by atmospheric air. Thus, oxygen enriched air, oxygen and other gases may also be employed as oxidant.

For quenching, it is possible to use any suitable fluid that is not deleterious to the products or to the internals of the reactor and collection system. Water is frequently employed. Also, refractory hydrocarbon oils may be used. Gaseous fluids, especially gaseous hydrocarbons, including feedstock or recycled cooled products of the cracking reaction, may also be employed.

The operating data for the process include various considerations pertaining to the container or chamber in which the reaction takes place, the type and rate of flow of the materials, the temperature and pressure employed, the manner of quenching, and the residence time.

The interior of the container or reaction chamber will generally be in the form of a cylinder, usually elongated. In this specification and claim the term cylinder is used in a broad sense requiring neither a circular cross section nor strictly straight or parallel sidewalls. The reaction chamber should be lined with any high temperature resistant refractory material which is well adapted to withstand erosion due to high gas velocities and friction of solid particles combined with temperatures in the range of 2700° F. and higher. Such refractories are available commercially, and high alumina castable refractory materials have been found most suitable. The cracking chamber and the introducing means for the fuel and oxidant are preferably so dimensioned and disposed that the fuel and oxidant travel through the cracking chamber closely adjacent to at least one refractory sidewall thereof.

The feedstock, solid fuel and oxidant streams flow concurrently (in the same general direction). The application of the term "stream" to the fuel solids may seem inappropriate, since this term is most frequently used to describe a flow of liquids or gases. Nevertheless, it serves a useful function in this disclosure, indicating that the solids move over a given flow path in a substantially uniform concentration or distribution.

The feedstock, fuel and oxidant streams may be completely separate from one another at their points of introduction. However, it should be understood that a limited degree of mixing of said streams prior to reaching the cracking zone may be possible and in some cases desirable. For instance, some of the oxidant may be mixed with fuel solids before introduction into the cracking chamber, so long as the major part of the combustion takes place in said chamber, e.g. part of the oxidant may be used as a gaseous conveying/disbursing medium for the fuel. When operating with heavy feedstocks, a small portion of the oxidant may be used as an atomizing medium for the feedstock. It should be understood however that only a relatively small portion of the total oxidant employed in the process is used for atomizing feedstock, and every attempt is made to minimize diffusion between the main stream of oxidant and the hydrocarbon feedstock stream. Thus, substantially all of the oxidant (excluding amounts used to assist in the introduction of feed and fuel to the cracking zone) is introduced to and conducted through the cracking zone in such a manner as to maintain it substantially separate from the feed stream until the streams have been diverted into separate recovery zones, or quenched or otherwise cooled or treated to preclude reaction between them.

The manner of introduction of the fuel solids is preferably such that they are introduced as a stream intervening between the feedstock stream and the oxidant stream(s). The fuel solids have, in addition to their longitudinal velocity component, a velocity component perpendicular to the cracking chamber axis and towards the oxidant stream(s). The object of providing the perpendicular velocity component is to gradually diffuse the solid particles into the oxidant stream(s). This results in a gradual burning of the fuel solids which continues from one end of the cracking zone to the other. The perpendicular velocity component will be relatively small in comparison to the longitudinal velocity component of the fuel solids, but should be sufficiently large to incorporate substantially all of the fuel solids into the oxidant stream(s) before reaching the end of the cracking zone.

When the flowing stream of feedstock and resultant products and the substantially separate stream of burning solid fuel, moving side by side, reach that portion of the cracking chamber where quenching is to take place, the necessity for maintaining separate streams ends, although as will be explained hereinafter, certain valuable economic and technical advantages will accrue from maintaining the separate identity of these streams during and after quenching. Thus, although it is possible to quench both the cracked products and combustion gases together in a manner which promotes thorough turbulent mixing of the quench fluid with both the cracked products and the combustion gases, thus destroying the separate identity of said streams, the cracked products are preferably withdrawn from the reaction chamber separate from the combustion gases and are thereafter promptly quenched. Such practice facilitates economic recovery of the products and increases the thermal efficiency which may be obtained when using the combustion gases in heat exchangers, boilers and the like as a heating medium.

The types of flow which best promote the retention of the feedstock and oxidant in separate streams as above described may be readily attained. In the case of the feedstock, a linear flow is desired. The flow of oxidant should be somewhat turbulent, but not sufficiently turbulent to fully destroy its character as a stream or encourage diffusion into the feed along the axis of the cracking chamber. Persons skilled in the art are aware of how to create a flow of gases characterized by linearity or any desired degree of turbulence by adjustment of gas velocity and smoothness of flow path.

Those skilled in the art will readily appreciate that the charging rates for feedstock and oxidant may vary widely depending upon the dimensions of the cracking chamber. The dimensions of the cracking chamber may be varied widely without detriment to the process. However, for a cracking chamber of given dimensions, and given the residence time, temperatures and pressures to be maintained within the process, one skilled in the art can readily compute the proper charging rates for oxidant, feedstock and solid fuel. The residence time for the feedstock should be in the range of 0.1 to 0.0001 second. The temperature and pressure conditions within the cracking zone will be discussed hereinafter.

Although, as explained above, it is not feasible to state limiting absolute values for the charging rates for the materials introduced into the reaction zones, certain generalizations can be made in regard to the relative volumetric charging rates for these materials. The fuel and oxidant should be introduced in a ratio which produces a stable flame. For any given reactor the proper ratio may readily be determined empirically. The reactor disclosed herein has been operated with acceptable flame stability while introducing fuel and oxidant in about stoichiometric proportions and while introducing the air at 80 percent to 150 percent of the rate theoretically required to produce a stoichiometric mixture of oxygen and fuel. In order to determine the proper charging rate for the hydrocarbon feedstock, one may calculate the heat release of the fuel-oxidant mixture which is employed and then, by known thermal chemistry and thermo-dynamics, estimate the amount of cracking stock that may be pyrolysed with a given quantity of fuel and oxidant. But in any case, optimum proportions of the fuel, oxidant and cracking stock can be established empirically.

Certain valuable benefits may be realized by controlling the relative velocities of the feedstock stream and the burning stream of carbonaceous fuel and oxidant. By holding the velocities of said streams as nearly equal as possible, interfacial slippage and turbulence between the streams is thereby minimized to the fullest extent possible, and the diffusion of feedstock into the oxygen stream, with consequent loss by combustion, it is thereby discouraged. Thus, where minimum loss of feedstock through interfacial mixing is highly critical it may be found desirable to control the velocities of flow of the burning stream and of the feedstock stream to maintain them "about equal," e.g. no more than about 20 percent difference. In this connection, it should be understood that adjustments can be made in the relative velocities of the streams without changing the relative volume flow rates of combustion gases and feedstock by varying the cross-sectional areas of the streams. Thus, one can attain the desired equality of velocity between the burning stream and the feedstock without destroying the quantitative and thermal balance between the amount of feedstock on the one hand and the amounts of fuel and oxidant on the other.

For the purpose of discussing the temperatures which should be employed in the process of the invention, it may be useful to define certain zones: external oxidant preheat zone; external feedstock preheat zone; internal feedstock preheat zone; cracking zone; and quenching zone. The external preheat zones are chambers outside the cracking chamber, in which zones preheating takes place. They may be heat exchangers, furnaces or the like in which the feedstock and oxidant are separately heated before introduction into the cracking chamber.

Preheating of the oxidant stream is highly desirable and, where the $O_2$ concentration in the oxidant stream is low, may even be essential. When needed, the external oxidant preheat zone is provided for this purpose. Air preheat temperatures ranging from about 200° to about 2000° F. are applicable, and a temperature of about 500°–1500° F. has been found quite satisfactory in actual practice.

Because of the endothermic character of the process, certain definite advantages may be realized by preheating the feedstock to the maximum temperature it can withstand without undue decomposition and consequent fouling of the preheaters. Thus, the feedstock should preferably be heated to a temperature slightly below the temperature of incipient cracking. The external feedstock preheat zone is provided for this purpose. For many feedstocks a suitable maximum will be a temperature in the range of about 1000° F. to about 1500° F.

The internal feedstock preheat zone is that portion of the upstream end of the cracking chamber in which the externally preheated feedstock stream is heated still further to the cracking temperature. The hydrocarbon feedstocks to which the present invention is applicable may be cracked to acetylene and mixtures of acetylene and ethylene by heating said feedstocks in the internal feedstock preheat zone temperatures in the range of about 1500° to about 3500° F., with temperatures in the range of about 2000° to about 3200° F. being preferred. Thus, upon introduction into the cracking chamber, the temperature of the feedstock should be raised as rapidly as possible until within the aforesaid range(s).

The cracking zone is that portion of the cracking chamber in which the feedstock is at cracking temperature. The temperature of the feedstock is measured in or near the center of the feedstock stream, preferably near the upstream end of the cracking zone. Temperatures somewhat higher than those of the feedstock may be found in the surrounding burning stream, so care should be taken to see that it is the temperature of the feedstock and not of the flame that is measured.

The maintenance of stable temperature in the feedstock stream in the cracking zone is extremely important in obtaining the kind of time/temperature history which leads to the highest yields and the best thermal efficiency. In accordance with the invention, the rate of heat release from combustion of the carbonaceous fuel is adjusted to be substantially the same as the rate of heat consumption from cracking of the hydrocarbon stock and from normal losses, so that energy exchange via radiation and any other applicable heat transfer mechanism(s) between and the cracking feedstock stream tends to maintain both streams at the desired temperature. On at least three counts, carbonaceous fuels have advantages which render them superior to hydrocarbon gases and vapors for this purpose.

First of all, the finely divided carbonaceous fuels offer great latitude of control over combustion rate. Unlike gaseous hydrocarbons, carbonaceous solids can easily be ground to varying particle sizes, and the combustion rates of carbonaceous solids are significantly affected by changes in particle size. Thus, through a combination of adjustments in the particle size of the carbonaceous fuel, the oxidant preheat temperature and the fuel-oxidant mixing intensity, the combustion rate of the fuel may be varied widely, permitting easier matching of the combustion rate to the cracking rate than is possible with gaseous and vaporous hydrocarbon fuels.

Secondly, in order that the above-described match between combustion and cracking rates may extend substantially throughout the cracking zone, a flame that is both long and steady is required. The cracking chamber may be of significantly greater length than diameter and, if the flame is to continue to radiate heat to the feedstock throughout the length of the cracking chamber, the flame will have to extend throughout the length of the chamber. When it is attempted to produce a long flame with hydrocarbon gases and vapors, it will be found that a steady flame is exceedingly difficult if not completely impossible to attain, at least under the conditions that prevail in a cracking chamber. By a "steady" flame is meant one which, to a very high degree, maintains substantially uniform length and is substantially free from wavering from side to side. The flickering, unstable flames that are obtained when it is attempted to produce a lengthy flame in a hydrocarbon cracking chamber by burning hydrocarbon gases and/or vapors reduce the thermal effciency of the cracking step and lower the yield by intermittently intruding upon the feedstock stream. Surprisingly, however, it has been found possible to produce long flames of an exceptionally stable character in a cracking zone, using carbonaceous solid fuels, thus improving both thermal efficiency and yield.

Thirdly, the emissivity of the flames of solid carbonaceous fuels is higher than the emissivity of the flames of hydrocarbon gases. The incandescent hot burning particles of carbonaceous solid fuel radiate heat into the feedstock stream at a faster rate than a stream of hydrocarbon gas of the same B.t.u. content. As has been explained above, it is important that the heating of the feedstock to its cracking temperature in the internal preheat zone take place as rapidly as possible, and the high emissivity of the flame of the solid carbonaceous fuel tends to produce more rapid heating than the flame of a hydrocarbon gas or vapor fuel.

Where the solid carbonaceous fuel has a substantial ash content, as is true of most coals, a definite advantage accrues from proportioning the rates of introduction of feedstock, oxidant and solid carbonaceous fuel in such a way as to maintain temperature conditions below the ash fusion temperature of the solid fuel and solid combustion products in substantially every portion of the preheating and cracking zones through which they may pass. If temperature conditions above the ash fusion temperature are maintained, then any object within said zones which may have a lower temperature than the ash fusion temperature will tend to acquire a coating of coalesced ash which increases in thickness until an acceptable equilibrium thickness is reached or the flow of material through the reactor is impeded by ash deposits to the point that there is a voluntary or involuntary shut-down for ash removal, or steps are taken to continuously or periodically remove the ash during furnace operation. If it is desired to operate above the ash fusion temperature for any reason, the accumulation of equilibrium thickness of ash may be quite acceptable provided the sizes of the parts which will tend to accumulate ash are chosen in such a manner that adequate space is left for process materials other than ash to flow through or past them, when the equilibrium thickness of ash is in place. Periodic shut-downs are to be avoided, if possible, due to the lengthy procedures involved in cooling off refractory-lined reactors and bringing them to reaction temperature again. Reactors with means for continuously removing ash deposits may be used in operations above the ash fusion temperature if desired. However, the simplest alternative from the standpoint of minimizing the complexity of the operation and the reactor is to operate below the ash fusion temperature, and such mode of operation is preferred. When this temperature limitation is observed, there will be no substantial tendency for ash to coalesce on the walls or quenching means in quenching zone or on the eductor to be described hereinafter, and therefore no necessity of removing the resultant deposits therefrom.

The quenching zone is that portion of the cracking chamber or other adjacent chamber in which the resultant cracked products are cooled until well below cracking temperature. The cooling should be carried out as rapidly as possible. Generally, the products should be quenched to a temperature of 800° F. or less. More preferably, the quench fluid temperature, flow rate and mixing intensity should be controlled to lower the temperature of the products and/or combustion gases to a temperature not greater than about 500° F.

The process may be conducted at super-atmospheric pressure, atmospheric pressure and sub-atmospheric pressure. Operation at atmospheric pressure has the advantage of convenience. However, under certain conditions, higher yields may be obtained by operating at a pressure of less than one atmosphere.

Persons skilled in the art are thoroughly aware of the residence times (time intervals during which a feedstock and resulting products are subjected to cracking temperatures) required to convert various hydrocarbons to preselected products, including those hydrocarbons and products disclosed herein. Generally speaking, a residence time in the range of about $10^{-1}$ to about $10^{-4}$ seconds is appropriate. Under certain circumstances, e.g. when low residence times are employed, it may be found difficult to have the feedstock and burning stream move at about the same linear velocity and at the same time completely burn the solid fuel within the cracking zone. It would not therefore be contrary to the spirit of the invention to conduct part of the combustion of the solid fuel outside the cracking zone, before the fuel stream is brought into proximity with the feedstock stream and/or after cracking has been completed and the products have been separated from the fuel. Thus, although it is preferred that the solid fuel be burned substantially to completion in the presence of the feedstock, such perference does not rule out the possibility of igniting and partly burning the solid fuel out of the presence of the feedstock. Beneficial results can be attained when at least the major portion of the solid fuel is burned in the presence of the feedstock. If a portion of the fuel is burned after passing through the cracking zone and after being separated from the products, such burning may be facilitated by injection of additional oxidant into the combustion product stream. It is apparent, however, that the simplest procedure is to conduct substantially all of the burning of the solid fuel in the presence of the feedstock and the maximum benefits from radiant heat energy exchange between the burning stream and the feedstock are thereby obtained, thus making this the preferred mode of operation.

The preferred products of the process will be acetylene, ethylene and various combustion product gases. Generally speaking, it is not considered economical under present conditions to attempt to produce acetylene and no ethylene or vice versa. However, by varying the feedstock to fuel ratio, or the temperature in the cracking zone, or the residence time or a combination of these and/or other process conditions, the ratio of acetylene to ethylene in the products may be varied. The acetylene/ethylene ratio which is chosen will depend upon complex economic variables and especially on the use to which the product stream will be put and the techniques used for separating the acetylene and ethylene from the combustion gases.

The acetylene and/or ethylene may be separated from the cracking chamber effluent and, if desired, may be purified by any combination of known techniques, of which there are many. However, it is preferred that substantially all of the acetylene and ethylene be withdrawn from the cracking chamber in a stream which contains less than half of the combustion product gases and that the remainder of the combustion gases depart the cracking chamber as a separate stream. The acetylene-ethylene stream is then treated in accordance with any known technique to separate the unsaturated products from the combustion products. A wide variety of separation techniques are contemplated, including, but not limited to adsorption, selective chemical reaction, high pressure distillation, solvent extraction and so forth.

DESCRIPTION OF A PREFERRED EMBODIMENT

Figure 3:
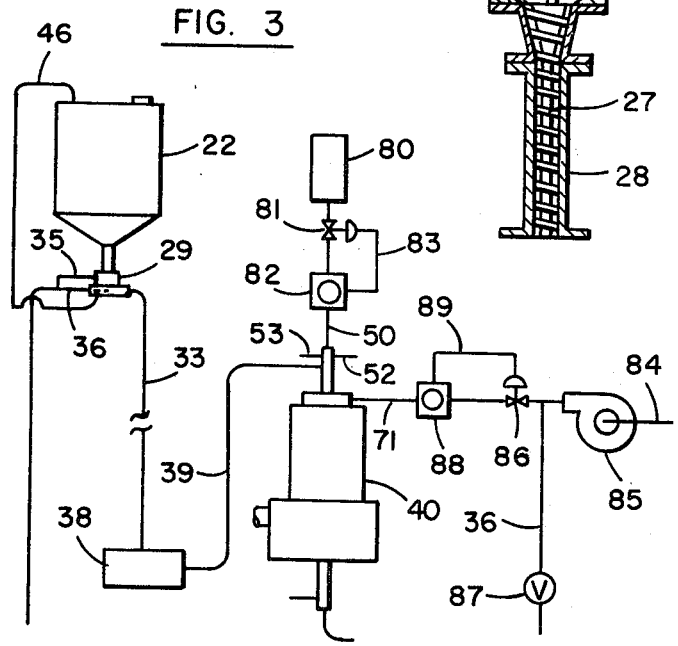
FIG. 3 is a diagram of the solids feeding system, including the feeding device and ejector of FIGS. 1 and 2, a grinder and associated piping.
Figure 2:
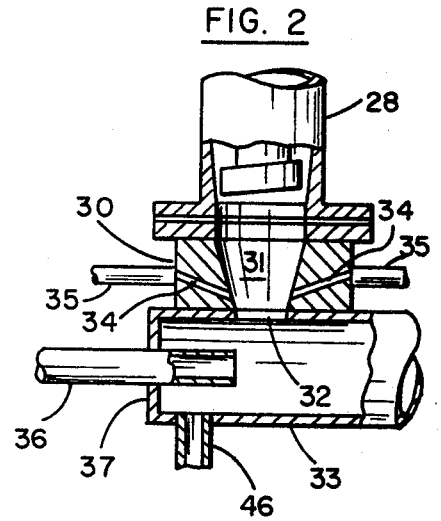
FIG. 2 is a partially broken-out sectional view showing a solids ejector which connects to the bottom of the feeding device of FIG. 1.
Figure 5:
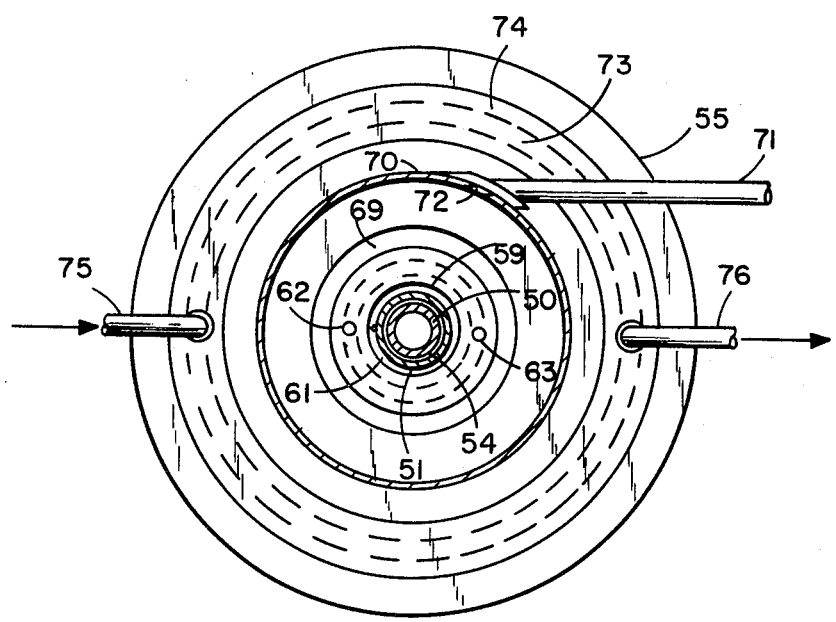
FIG 5 is a sectional view of the burner assembly of FIG. 4A, taken along section line 6—6.

A preferred embodiment of the apparatus aspects of the invention will now be described with the aid of the accompanying drawings. In the preferred embodiment shown in FIGS. 1 through 6, there is disclosed a solids feeding apparatus (FIGS. 1–3), a thermal cracking apparatus (FIGS. 4A, 4B and 5) and a recovery system (FIG. 6).

The provision of a solids feeding apparatus capable of delivering a highly uniform flow of solids to the burner assembly is highly essential to the attainment of a stable flame in the cracking chamber. Difficulties in attaining this objective in small experimental systems may possibly have been a deterrent to the development of solids-fueled cracking reactors in the past, since the solids-feeding problems that were experienced in the initial stages of making the present invention were substantial. The problems of feeding solids uniformly are compounded in small systems because the ratio of solid particle dimensions to feeder dimensions decreases as a given feeder is scaled down. Erratic and cyclic fluctuations in solids delivery rates result in experimental data which is quite different than that which would be obtained under highly stable conditions. The low residence times associated with the object of this invention make the problem of uniform solids feeding particularly important. Heat transfer from an annular combustion region to a central cracking region is dependent on flame luminosity or emissivity which is in turn dependent on the concentration of carbonaceous solids in the primary air stream. Cyclic solids flow, solids agglomerate formation in the feeding and conveying system, and dead or stagnant zones in the conveying system which erratically accumulate and discharge solids all result in pronounced deterioration in system performance. The system which was developed to feed the solids in the desired manner is presented as a disclosure in this patent application because, so far as the inventor knows, no suitable experimental apparatus of this type was available heretofore, and consequently achievement of the results included herein in small systems appears to be contingent on the availability of the disclosed apparatus or one capable of equivalent performance.

The experimental solids feeding apparatus disclosed herein may be supported in any convenient manner (FIG. 2), but it is preferred to hang it from an overhead support 20 through a system of supporting members including a weight measuring device 21, such as a strain gauge. As is well known to those skilled in the art, such gauges are capable of converting a load or strain into an electrical signal representative of the weight suspended therefrom, which electrical signal may be conducted to a remote indicating panel or control device for monitoring or controlling the delivery rate of carbonaceous fuel. Mounted on hopper 22 is an electric motor 23 provided with a reduction gear and thrust bearing assembly 24. The latter is connected by suitable coupling means to a shaft 25 upon which are mounted an agitator 26 in the lower portion of the hopper and a feed screw 27 in an outlet tube 28 connected to the bottom of the hopper. The reduction gear 24 is preferably provided with a variable speed drive to permit control over the rate of rotation of the feed screw and thus over the solids delivery rate. Pulverized coal suitable for boiler firing (60% by weight will pass 200 mesh), which is among the various fuels useable in this system, has an angle of repose of 90°, thus necessitating precautions to insure that the feed screw 27 runs full. The agitator 26 tends to maintain the bulk density of the solids constant and independent of solids inventory. This in turn results in a solids rate which is independent of the amount contained in the hopper. The agitator also serves to prevent bridging and resultant fluctuations in the solids rate.

It will be noted that the feed screw is divided into two sections, an upper section of generally frusto-conical configuration which is the pickup section; and a lower or conveyor section which is of uniform flight diameter throughout its length. Although those skilled in the art will readily recognize that these dimensions can be widely varied and that there is no intention to be bound thereby, the following dimensions and properties have been found desirable in such screw. The preferred conveyor section comprises a 1/1 pitch to diameter screw, 1½ inches in diameter and 12 inches long, with a 0.79 compression ratio (ratio of intake channel depth to discharge channel depth), and a flight clearance varying from 0.005 inch at the inlet to 0.007 inch at the discharge. Both the screw and the barrel 28 are machined from "Ry-Alloy" (trademark of the Ryerson Company for their hardenable tool steel product) and subsequently heat treated to a 62–64 Rockwell C hardness. The screw root surface is polished to mirror like surface. This screw is designed to feed 10–40 pounds per hour at 25–100 revolutions per minute. The progressively decreasing depth of the discharge channel of the feed screw results in compression of the coal in the screw as it proceeds from the top of tube 28 to the bottom, so that when the fuel reaches the discharge end of the screw, the fuel is packed quite closely between the flights of the screw. This tends to prevent air leakage from the discharge to the pickup of the screw and corresponding fluctuations in solids feed rate.

Outlet 28 is connected with a solids ejector nozzle assembly 29 including an upper body portion 30 having a tapered bore or nozzle 31 of frusto-conical (60° angle) configuration therein. The conical nozzle is mounted directly below and in communication with feed screw 27, and has a longitudinal axis coinciding with that of the tube 28, and has an internal diameter at its upper end corresponding to the internal diameter of the latter. The nozzle tapers down to an outlet 32 of approximately ⅓ the foregoing diameter, at which point it opens into a conduit section 33. A plurality of passages 34, provided with supply conduits 35, are interspersed about the conical surface, intersecting tangentially therewith and at a 45° angle to its longitudinal axis. The purpose of the passages 34 is to conduct air or other gas in a swirling downward movement to prevent carbonaceous fuel solids from bridging across the conical walls. The supply pipes 35 are connected with any suitable source of pressurized flowing gas, e.g. air, for this purpose. In a solids ejection nozzle in which the nozzle tapers from 1.5-inch inlet to a 0.5-inch outlet and in which there are three tangentially disposed 1/16" passages 34 spaced at equal intervals about the periphery of the cone, an air flow of one-hundred s.c.f.h. has been found suitable.

The longitudinal axis of the conduit section 33, directly below the conical nozzle, is perpendicular to the axis of the latter. There is an opening in the conduit section 33 in registry with the outlet 32 of the conical section to permit fuel solids to enter same. A coaxial conduit 36 of smaller diameter than conduit 33 is positioned in the latter, and terminates in an open end adjacent the projected end of conical section 31, but does not block the outlet thereof. The conduit 36 is supported in place by the closed end 37 of conduit 33. In a solids ejection nozzle having the dimensions previously stated, and in which the conduit section 33 has a ¾-inch inside diameter and the air supply conduit 36 has a ¼-inch outside diameter, an air flow of approximately 600 s.c.f.h. has been found suitable for creating a reduced pressure (as compared to that in the hopper 22) in the conical section and assisting in the withdrawing of the coal solids therefrom. The provision of a conduit 46 connecting conduit 33 and hopper 22 has also been found helpful in that it tends to reduce or eliminate the pressure differential across screw 27.

The portions of the solids feeding system described thus far are for the purpose of establishing a controlled rate of flow of fuel solids in a conduit, such as conduit 33. However, in the process of setting up a controlled rate of flow of coal solids with a screw, agglomeration may occur, to a varying extent. Therefore, the solids feeding apparatus is provided with means for breaking up any such agglomerates that might form and for attenuating small fluctuations in the flow of solids coming from the feed screw. As will be apparent from FIG. 3, the conduit 33 extends to the inlet of a hammer mill type grinder 38. It will be noted that the largest part of the length of conduit 33 is disposed as a vertical run into the top of the grinder. The grinder, which may be cooled by a water jacket if desired, breaks up any agglomerates formed in the compression section of the screw 27 and discharges the ground fuel suspension through a screen (not shown) with one-sixteenth diameter round holes into a conduit 39 which extends to the fuel entry inlet 60 of the cracking reactor 40.

The system just described has been found adequate for feeding fuel solids over extended periods at acceptably stable rates appropriate for operation of the reactor disclosed herein. Since the ratio of solid particle dimensions to feeder dimensions will increase as the feeding system is scaled up, it appears that the problems of building an operable production scale unit would be no greater, and would probably in fact be smaller. The through-put of a production-sized solids feeding system might well reach 100 tons per day or higher. Grinding, metering and conveying equipment for such through-puts is readily available. A contemplated production sized unit could include a Fuller-Kinyon pump feeding ⅛ x 0 dry coal (less than 5% moisture) to a ball mill, rod mill or other grinding device capable of producing a pulverized boiler fuel. The grinder would discharge a continuous flow of solids and conveying air to the cracking reactor.

Other supporting apparatus for the reactor include supply and metering apparatus for the feedstock and supply and metering apparatus for the oxidant. Such equipment is quite familiar to persons skilled in the cracking art and it will not therefore be described in detail. However, examples of such equipment are illustrated schematically in FIG. 3. As shown therein, a supply 80 of feedstock is connected through pneumatic control valve 81 to recording flow controller 82 which controls valve 81 through a feedback control loop 83 to maintain a constant flow of feedstock into feedstock inlet tube 50 of the reactor 40. The controller 82 is of a type which has an adjustable set point, permitting preselective variable control over the feedstock flow rate at any given operating temperature. When the oxidant is air, a conduit 84 may be used to withdraw air directly from the atmosphere into a rotary centrifugal air pump 85 which discharges into a pneumatic flow control valve 86 and into a branch conduit 36 which feeds conveying air through a regulating valve 87 to solids ejector nozzle 29, including conduits 35. Such conveying air travels with the dispersed fuel solids through conduit 33, grinder 38 and conduit 39 and enters the reactor 40 through fuel solids inlet 60. Such air is sometimes referred to herein as primary air. The air which proceeds from blower 85 through valve 86 is sometimes referred to herein as secondary air. The valve 86, flow controller 88 and feedback loop 89 constitute a preselective variable control means for the flow of the primary oxidant stream which, after passing the controller, enters the reactor through inlet tube 71. Preheaters for oxidant and feedstock are conventionally used in conjunction with cracking reactors, and they (not shown) may be included in the foregoing system at any convenient location.

The reactor 40 shown in FIGS. 4A and 4B includes the following subportions: cracking chamber 42 and its side wall means 43; burner 41; product eductor tube 44, including quenching means; and combustion product collection chamber 47 with off-gas and ash handling means.

The side wall means 43 of cracking chamber 42 is a cast tube of refractory material such as Harbison Walker Castolast G high alumina refractory cement. The tube is cast and cured in accordance with conventional procedures commonly employed by those skilled in the art of fabricating high temperature resistant refractory linings for cracking reactors, such as those used in the carbon black art. The tube employed in this preferred embodiment is of precisely circular cross section, has a uniform diameter and is straight throughout its length, and has the following dimensions: I.D. 3''; O.D. 12''.

The inner surface of the wall means is free from turbulence-inducing projections and roughness throughout the length of the zone in which cracking is intended to take place. Thus, no sharp changes of direction, chokes, checkerwork, or other obstructions are included within that portion of the cracking chamber where cracking is to take place.

To the upstream end of the cracking chamber is secured a burner 41. The latter includes a base plact 55 which is connected to the refractory tube perpendicular to its longitudinal axis at the upstream end thereof. The plate 55 supports the inlet means for feedstock, oxidant and fuel and forms a closure or upstream end wall for the cracking chamber. The surface of plate 55 which faces chamber 42 is also referred to herein as the burner face. Although it is not required to be so, the burner face is planar in this embodiment, and the apertures through which the fuel, feedstock and oxidant gain admission to the cracking chamber are in the burner face, so that they are all located in the same plane. For the purpose of supporting certain parts of the introducing means for the feedstock and fuel, a conduit member 56 is secured to the plate 55 on the extended longitudinal axis of chamber 42. The conduit 56 has an inner end of reduced cross section which fits into an opening of reduced cross section in the outer surface of plate 55, into which the conduit is fixedly secured. An opening of the same diameter as the inside of conduit 56 is cut through the burner face so as to be disposed in registry with the inside of the conduit. Disposed coaxially within the conduit 56 is a conduit 50 which terminates at the burner face, but is longer than conduit 56. Conduit 50 is a straight run of tubing of uniformly circular cross section having a length to diameter ratio on the order of about 20 to 1 which ratio may if desired be decreased slightly to less than 20 to 1 or increased to infinity. In the present embodiment, the conduit 50 is ⅞'' inch in inside diameter and 20 inches long.

In the present preferred embodiment, the source 80, valve 81, controller 82 and control loop 83, which were mentioned previously, as well as the conduit 50, considered collectively, constitute the feedstock introduction means, with the conduit 50 constituting the nozzle which directs the feedstock stream into the cracking chamber. The inner surface of the walls of conduit 50 constitute a stream-forming member which as a consequence of its position, shape and dimensions, carries out the function of confining the flow of hydrocarbons (e.g. feedstock and/or products) or at least the major portion thereof, to a flow path which occupies less than about half of the transverse cross-sectional area of the cracking chamber. By "transverse cross-sectional area" is meant the area of the chamber measured in a plane perpendicular to the longitudinal axis of the chamber. The requirement for confining the hydrocarbons to this limited cross section extends throughout that portion of the chamber in which the hydrocarbons are travelling in unobstructed side-by-side relationship with the burning fuel (no intervening barrier) and are at combustion inducing temperatures. However, once the hydrocarbons have entered a zone in which they are separated from the oxidant by a physical barrier and/or have been cooled to temperatures at which combustion is no longer a substantial danger, the confining requirement no longer exists. Any other feedstock stream forming member which performs or assists in the function of confining the flow of the major portion of the feedstock to the specified cross section at least until it reaches the downstream end of the cracking zone may be added to or substituted for the conduit 50, even if the confining effect thereof is less than perfect or even somewhat crude. Thus, for instance, feedstock nozzles with drag-inducing members therein on their longitudinal axes for slowing the velocity of the center of the stream, or feedstock nozzles which other than circular cross section may be used. It is preferred, however, to use that type of nozzle which promotes the least possible mixing of the feedstock with the burning fuel and the unobstructed, 20 to 1 or greater length to diameter ratio, circular cross section tube is considered best for this purpose at the present time.

The conduit 50 is provided with a cooling jacket 51 having an interior 54 and coolant inlet 52 and outlet 53. The outer surface of the cooling jacket 51 and the inner surface of the conduit 56, respectively, define the inner and outer boundaries of an annular fuel introduction passageway 59 closed off at one end by apertured cap 57 and gas-tight gasket 58 and the coolant circulating in interior 54 of cooling jacket 51 helps prevent sticking of the fuel particles on passageway 59. The downstream end of passageway 59 constitutes a port which opens through the burner face into cracking chamber 42 surrounding conduit 50. The term "surrounding," wherever used in the present specification and claim, means that the item described thereby, e.g. said part, encircles more than half of the way around the feedstock nozzle conduit 50. The aforesaid part preferably extends substantially all the way around the conduit 50 in the burner face, so that the feedstock stream will be enclosed substantially completely by the fuel stream. Thus, an annular opening is desirable. However, this does not rule out the provision of braces or spokes in the annular fuel opening for maintaining alignment between the conduits 50 and 56, so long as such braces or spokes are dimensioned, shaped and finished in such a manner that they do not unduly disturb the desired flow of fuel solids. Thus, braces in the form of fixed turbine blades extending between the conduits may be used to advantage both for maintaining alignment between them and for imparting a rotational component of motion to the fuel stream. It has been found however that the same result can be obtained at a lower cost of construction by wrapping the exterior of the cooling jacket 51 with wires 61 whose diameters are substantially the same as the spacing between the jacket and conduit 50, the turns of wire being separated longitudinally to provide one or more helical passages. Thus, in this preferred embodiment in which the conduit 50 is 1" x 16 gauges x 347 ss, the cooling jacket 51 is 1.25" x 16 gauges x 347 ss and the conduit 56 is a 1.5" conduit, 12⅛" diameter wires 61 are silver soldered to the exterior surface of the cooling jacket 51 so that they are angularly spaced from one another in the annular passageway 59 at about 30° intervals and rotate through 180° about the periphery of conduit while traversing a longitudinal distance of about 3" in said passageway. This assembly, and the blower 85, valve 87, conduit 36, solids feeder assembly of FIGS. 2 and 3, conduit 33, grinder 38, conduit 39 and tangential entry fuel inlet into passageway 59, considered collectively, constitute a preferred means for introducing solid carbonaceous fuel into the cracking chamber 42 with components of motion downstream in said chamber and divergent from the general direction of movement of the feedstock stream.

In this embodiment the centrifugal force generated by rotation of the fuel stream is the factor which induces its outward component of motion which causes its direction of movement to diverge from that of the feedstock. However, rotation-inducing fuel introducing means are not required. For instance, the wires 61 may be omitted and the open end of passageway 59 may be flared as it approaches the burner face. Various types of deflectors may be used without departing from the scope of the invention.

Spaced outwardly from passageway 59 in the walls of conduit 56 are a pair of passages 62 and 63 which have been provided to conduct a mixture of oxygen or air and fuel gas from an external source, not shown, to an annular distribution chamber whence such mixture is directed through twelve pilot lights 66 equally spaced (angularly) from one another around the longitudinal axis of conduit 50 and having their discharge outlets between the fuel introduction port and the oxidant introduction means to produce pilot flames 68.

Surrounding the passageway 59, and preferably spaced outwardly from the pilot lights 66 is an oxidant introduction means 69 extending through the plate 55 and the burner face and communicating between the interior of manifold 70 and that of the chamber 42. The walls of manifold 70 are secured in gas-tight relationship to the top of plate 55 and the periphery of the conduit 56. The oxidant supply conduit 71 enters the manifold tangentially through inlet 72. The oxidant introduction means 69 may take various forms. For instance, it may be an annular port, or it may be a number of (e.g., twelve) passageways arranged at equally, angularly spaced intervals about the longitudinal axis of conduit 50. The oxidant introduction means should be adapted for distributing the oxidant as evenly as possible around the periphery of the chamber 42. The data a set forth in the example hereinafter was obtained with a reactor in which the oxidant introducing means is twelve passageways as above described. However, there is some evidence that even better performance can be obtained with an annular port.

Regardless of its form, it is considered advantageous for the feedstock introducing means to be spaced outwardly from the feedstock conduit 50 by a substantial distance, e.g. a distance which is at least equal to the radius of the conduit 50. The feedstock introducing means can be directed either in the same direction as the feedstock conduit 50 or in a divergent direction but should not be directed in a convergent direction. Such divergence is particularly useful in embodiments of the invention in which the chamber 42 has divergent walls and the hydrocarbon stream is permitted to freely expand as it moves downstream. However, in the present embodiment, the passageways 69 are arranged with their longitudinal axes parallel to that of feedstock conduit 50 and chamber 42, so that they direct at least the major portion of the oxidant (e.g. secondary air) downstream in the chamber 42 adjacent side walls means 43. Such a mode of construction is simple and appears satisfactory. It should be understood that the oxidant inlet need not be in the form of a single annular port or single circle or spaced passageways. A plurality of such circles or ports or one or more of each in combination with the other may be provided. In any event, such annular port(s) or passageway(s), or other kinds of outlet or outlets taken together with the blower 85, valve 86, control loop 87, controller 88, conduit 71, and manifold 70, constitute an acceptable oxidant introducing means for producing an envelope of oxidant surrounding the fuel and for directing the oxidant downstream while keeping it spaced outwardly from at least the major portion of the feedstock stream.

As previously indicated, the use of a planar burner face in which the openings through which the feedstock, fuel and oxidant all gain access to cracking chamber 42 are all in the same transverse plane is a matter of convenience in construction and is by no means essential. If desired, one or more of the inlets for the fuel, feedstock and oxidant may be placed an appreciable distance downstream in the chamber. For example, a frusto-conical burner face may be employed in which the long radius end of the frusto-conical burner is situated at the upstream end of the cracking chamber, the short radius end of the burner extends downstream in the chamber, and the axis of the burner coincides with that of the chamber. In such case, the feedstock opening may be in the small circular downstream end of the frusto-conical burner member on the longitudinal axis thereof, and the fuel and oxidant inlets may be annular ports located at longitudinally spaced points in the conical surface. Such a construction is particularly useful in a reactor in which the walls of the cracking chamber diverge towards the downstream end thereof. In this connection, it should be understood therefore, that the use of the term "surrounding" to express the spatial relationship between the fuel inlet and the feedstock inlet on the one hand, and the oxidant inlet and the fuel inlet on the other, does not require that these inlets be in the same plane. Rather the term is used, as previously mentioned, to convey the idea that one inlet encircles the other, and if the requisite degree of encirclement can be seen in a transverse cross-section of the reactor looking upstream from a point immediately downstream of the inlets in question, then the requirement of "surrounding" has been met. For similar reasons, the terms "outward" and "outwardly" should not be interpreted as requiring that the things or actions designated thereby exist or take place in the same transverse plane. It should be apparent therefore that the details of construction given herein in respect to the preferred embodiment are illustrative only and many variations thereon, falling within the spirit of the invention, will occur to those skilled in the art.

In order to protect the plate 55 from the high temperatures generated within the cracking chamber 42 by the combustion of the solid fuel and oxidant, it has been found desirable to provide the plate with cooling. This has been done by providing a circular groove 73 in the upper surface of plate 55, by covering over said groove with a circular cover plate 74 to form a leak-proof passage. Cooling fluid, e.g. water is admitted to said passage by a supply pipe 75 and departs through outlet pipe 76.

While any conventional quenching, product withdrawal and recovery system may be used with the portions of the reactor discussed thus far. I prefer to use the eductor tube shown in FIGS. 4A and 4B and the recovery system shown in FIG. 6. In the preferred embodiment disclosed herein, the eductor tube 44 is stationed on the longitudinal axis of cracking chamber 42 with its inlet port 105 directed towards feedstock conduit 50. In reactors of differing configuration, it might be necessary to locate the eductor in reference to some point other than the cracking chamber axis in order to intercept the highest concentration of cracked products, but with the reactor shown herein the axial location is preferred. The eductor may be supported in any convenient manner either fixed or moveable, and may be attached to any convenient part of the reactor. However, in the reactor shown herein, it is preferred that the eductor be supported in the bottom wall of the combustion product collection chamber 47.

The chamber 47 comprises top wall 95, side walls 96, and bottom wall 97 in which is disposed a stuffing box 99 centered about the extended axis of chamber 42 and in registry with passages 104 and 103 formed in the upper and lower walls, respectively, of chamber 47. Passage 103 is of slightly larger diameter than the outside of eductor tube, while passage 104 is of slightly larger diameter than the inside of the cracking chamber. The eductor tube extends from outside the chamber 47, through stuffing box 98, through passage 103, through chamber 47 and through passage 104 into cracking chamber 42. The stuffing box includes packing 99 and a packing nut 100 for compressing the packing against the sides of eductor tube 44 and against the outer end of passage 103. With the nut loosened, the eductor tube may be extended or retracted axially to place its port 105 at any desired distance from the end of feedstock conduit 50. The nut 100 may then be tightened to immobilize the eductor tube in the desired position.

Because of the very high temperatures required in the cracking chamber, and the fact that the eductor will ordinarily be made of steel instead of refractory material, some sort of internal cooling is usually required. This may be accomplished by building the tube of inner 101 and outer 102 concentric conduits forming an annular coolant passage 106 within the body of the eductor. The passageway 106 should traverse at least that portion of the length of the eductor which is extendible into the cracking chamber 42, and preferably traverse, as shown in FIGS. 5A and 5B, so much of the tube as is extendible into the reactor, including not only chamber 42, but chamber 47 as well. The coolant passage is preferably closed off at both its inner 107 and outer 108 ends, and the inner tube 101 extends beyond the outer end of said passage for connection with any suitable product recovery system, such as that shown in FIG. 6. Coolant, such as a gas or liquid, e.g. water, may gain entry to coolant passage 106 through a fresh coolant delivery conduit 109 communicating with said passage from outside the reactor.

In accordance with the invention, the eductor may be provided with any convenient form of used coolant outlet at any convenient location. However, it is preferred that the used coolant outlet should be situated in a portion of the eductor which is within the reactor, where it may be used for quenching the cracked products. In its most preferred form the coolant outlet means comprises a plurality of outlets 110 communicating between coolant passageway 106 and the interior of conduit 101 adjacent inlet port 105. Thus disposed, the waste coolant outlets may be used to direct coolant into the cracked products as they enter the eductor through port 105, thus quenching them. Without any intention of being bound thereby, the following dimensions are set forth as constituting preferred dimensions for the eductor: outer tube 102, 1.50" x 16 gauge x 347 ss.; inner tube 101, 1.25" x 16 gauge x 347 ss.; and waste coolant outlets 110, 24 in number, .02" in diameter, equally spaced in groups of 8 about 3 circles, 1/16", 1/8", and 3/16", respectively, from the inner end 107 of the eductor. Those skilled in the art will recognize that these dimensions may be readily varied to suit various reactors and operating conditions.

Because the outer transverse dimensions (e.g. diameter) of the eductor assembly are substantially less than the transverse dimensions e.g. diameter) of the inside of the cracking chamber, an annular passageway 45 of appreciable width is provided therebetween. This passageway is provided for hot products of combustion to depart the reactor and may be provided with an injector to burn any coal which reaches this point wthout having burned. It should be apparent that the eductor tube may be used in cracking reactors in which other than solid carbonaceous fuel is used. However, in the present embodiment, the passageway 45 will conduct both gaseous and solid (ash) products of combustion. Passageway 45 communicates through passageway 104, with chamber 47, where the gaseous combustion products may be drawn off through outlet 111 and any solids which collect therein can be periodically removed through a scuttle 112.

As shown in FIG. 6, the conduit 101, through which the quenched cracked products depart the eductor and the reactor, is connected to a quench fluid separator 123 having a fluid outlet 124 and a cracked products outlet conduit 125. Conduit 125 communicates with a gas/solids separator system 126 (e.g. agglomerator and bag filter) which is used whenever solid cracked products (e.g., carbon black) are being produced. The gas/solids separator system outlet 127 discharges into a conduit 128. When no solids are being produce, the gas/solids separation system may be by-passed and the quench-fluid-free products may be passed directly to conduit 128 by opening by-pass valve 129. A pneumatically-actuated motor valve 130 and differential pressure transmitter/controller 131 are located in conduit 128, the controller 131 being interconnected with the motor in valve 130 through a feed-back loop 132. Between the controller and valve is a vacuum gauge 133 for visual reading of the vacuum in conduit 128. On the downstream side of the controller 131, conduit 128 connects to the suction side 122 of a steam ejector 120, an aspirator type device which uses steam from a supply conduit 121 to pull a vacuum on the conduit and on the eductor upstream through the quench water separator 123 gas/solids separator 126 or by-passed valve 29, motor valve 130 and controller 131. Steam and gaseous cracked products depart the ejector through outlet 134 into condenser 119 which converts the steam vapors to entrained liquid. The entrained liquid and cracked products depart condenser 119 into condensate separator 118 which delivers condensate through a condensate outlet 117 and substantially liquid free cracked gaseous products through a product outlet 116. Outlet 116 may be connected to any suitable product purification or recovery device of which a wide variety are known to persons skilled in the art. Accordingly, no description of such devices will be given herein.

The differential pressure controller/transmitter is of a type having a preselective variable set-point, so that it can open and close motor valve 130 to maintain any selected vacuum in conduit 128, and in conduit 101. Since the pressure in cracking chamber 42 is also controlled, by controlling the rates of flow of feedstock, fuel and oxidant and the rate of combustion, the ejector 120, controller 131, control loop 132, and valve 130, considered collectively, constitute an acceptable means for producing a controlled negative pressure differential between the interiors of the cracking chamber and eductor.

The use of the eductor tube and associated means for producing the aforesaid pressure differential contribute certain operating efficiencies to the cracking processes. For instance, the products are diluted to a much lesser extent with combustion gases than in the case of the usual precombustion, partial combustion and other pyrolytic cracking processes. This reduces the size and cost of the recovery system needed to handle the cracked products. It also considerably reduces the extent of purification needed to put the product in a saleable or useable form. The use of the eductor avoids the necessity of quenching all of the hot combustion gases in the reactor to cool the products, so that heating value available from the waste combustion gases is available for recovery at a high level of thermal efficiency instead of being wasted. The movable feature of the eductor tube facilitates process control, in that it makes possible quick adjustment of the residence time of the feed and products without the necessity of altering the rates of introduction of fuel, oxidant and feedstock into the reactor. It has been found possible to extend and retract the eductor tube over subsantial distances within the cracking chamber without adversely affecting reactor operation.

EXAMPLE

This example illustrates the operation of the process and apparatus described above.

Process conditions
Feed: Propane
Propane temperature: 1100° F.
Propane rate: 63.5 pounds per hour
Fuel: No. 2 gas seam coal from Boone County, W. Va., supplied by Obelbay Norton
    B.t.u. content (moist. and ash free basis), per pound: 14,500
    Ash content: 7%
    $H_2$ content: 7%
    Volatile content: 33%
    Ash fusion temp.: 2800° F.+
    S content: 0.8%
    Fixed C: 60%
    FSI: 5
    Percent passing 325 mesh sieve: 60%
    Moisture content: 2%
Fuel rate: 31 pounds per hour
Oxidant: Air
Air temperature: 1100° F.
Air rate: 5800 s.c.f.h.
    Percent of air introduced as secondary air: 90% (approx.)
    Percent of air introduced as primary air for suspending coal: 10% (approx.)
Distance of eductor from burner face: 4.5 inches
Quench fluid: Water
Water temperature at inlet to eductor: 80° F.
Water rate: 3.5 g.p.h.
Pressure in reactor: 1 lb. p.s.i.g.
Refractory temperature: 3000° F.
Residence time of hydrocarbons in cracking chamber: 1 millisecond (approx.)
Quenched products temperature: 150° F.
Flow rate of quenched products stream: 850 s.c.f.h.

The flame exhibits good stability and has an intense orange to white color. No supplementary fuel gas is used after start-up, except for the negligible amount of fuel gas consumed by the pilot lights. The gas from the eductor and from the annular passage surrounding it are sampled under steady state conditions and are analyzed. The results of the analysis are set forth as follows:

| Component | Volume (percent) | |
|---|---|---|
| | In eductor | In annular passage |
| $H_2$ | 9.8 | 13.3 |
| $O_2$ | 0.2 | 0.1 |
| $N_2$ | 71.6 | 66.4 |
| CO | 11.0 | 10.2 |
| $CO_2$ | 5.2 | 4.2 |
| $CH_4$ | 0.2 | 1.8 |
| $C_3$" | 0.4 | 1.0 |
| $C_2$" | 1.5 | 3.0 |

The carbon balance is then calculated with the following results:

Item:                                  Pounds per hour
  In:
    As propane _____ 52
    As coal _____ 23.5

Total _____ 75.5

Out:
    As $C_2H_2$ _____ 10.4
    As $C_2H_4$ _____ 4.4
    As $C_3$'s _____ 0.1
    As $CH_4$ _____ 3.0
    As $CO_2$ _____ 7.9
    As CO _____ 18.8
    As carbon black _____ 14.0

Total _____ 58.6

Unaccounted for:
    (Unburned carbon in coal) _____ 16.9

In conclusion, while the foregoing specification and drawings describe the construction, operation and use of certain preferred embodiments of the instant invention, it is to be understood that there is no intention to limit the invention to the precise construction and arrangements herein disclosed, since the various details of construction, form and arrangement may obviously be varied to a considerable extent by any person skilled in the art without really departing from the basic principles and novel teachings of this invention and without sacrificing any of the advantages thereof. Accordingly, the appended claim is intended to encompass all changes, variations, modifications and equivalents falling within the scope of the invention.

What is claimed is:
1. Apparatus for cracking hydrocarbons comprising:
(a) cracking chamber having a circular cross section and defined upstream and downstream ends connected by sidewall means;
(b) means for introducing hydrocarbon feedstock at a controlled rate, connected with the interior of said chamber at its upstream end, said means including a stream-forming member formed and disposed to form the feedstock into at least one stream and to project said stream along a flow path extending downstream in said chamber, spaced inwardly from the sidewall means thereof, and occupying less than about one-half of the transverse cross-sectional area of said cracking chamber;

(c) a solid carbonaceous fuel hopper located externally of said cracking chamber;

(d) means connected to said fuel hopper for discharging solid carbonaceous fuel from said hopper at a preselected, variable quantity rate;

(e) outlet means connected with the discharge end of said means for discharging, said outlet means having gaseous supply means in communication therewith for forming said solid carbonaceous fuel into a gaseous suspension in a gaseous medium;

(f) means for continually introducing said gaseous suspension of solid fuel into said upstream end of said cracking chamber at a controlled rate with components of motion downstream in said chamber and divergent from the general direction of said feedstock flow path, said means for introducing said gaseous suspension of solid fuel being connected with the interior of said cracking chamber at said upstream end of said chamber and surrounding at said upstream end of said chamber said means for introducing feedstock of (b);

(g) grinder means, interconnected between said means for introducing said gaseous suspension of solid fuel into said chamber and said outlet means, for grinding the gaseous suspension of solid fuel;

(h) means for introducing a gaseous oxidizing medium into said upstream end of said cracking chamber, connected with the interior of said chamber and surrounding said means for introducing said gaseous suspension of solid fuel of (f) at least in part and spaced outwardly therefrom, said means for introducing gaseous oxidizing medium being adapted to produce an envelope of oxidizing medium surrounding said gaseous suspension of solid fuel and to direct said oxidant downstream outwardly from at least the major portion of said hydrocarbon feedstock stream;

(i) means for igniting said gaseous suspension of solid fuel positioned at said upstream end and inside said cracking chamber;

(j) means for quenching cracked hydrocarbon products positioned downstream of said feedstock introducing means;

(k) an educator tube of substantially lesser transverse dimensions than said cracking chamber for recovering cracked hydrocarbon products separately from combustion products formed, mounted on the longitudinal axis of said cracking chamber downstream from said quenching means, having an inlet port in the flow path of said hydrocarbon cracked products, and facing said hydrocarbon feedstock injection means;

(l) outlet means communicating with said downstream end of said chamber for removing said combustion products separately from said cracked hydrocarbon products; and (m) means communicating with the interior of said eductor tube for generating a controlled negative pressure differential between the interior of said cracking chamber and the interior of said eductor tube.

References Cited
UNITED STATES PATENTS

| | | | |
|---|---|---|---|
| 3,563,706 | 2/1971 | Gunnell | 23—259.5 X |
| 3,376,111 | 4/1968 | Stegelman | 23—259.5 X |
| 3,147,795 | 9/1964 | Livingston et al. | 110—22 A X |
| 3,256,842 | 6/1966 | Vigneron et al. | 110—22 R X |
| 2,885,199 | 5/1959 | Patterson | 110—22 A X |
| 2,015,085 | 9/1935 | Oberle | 23—277 R UX |
| 2,805,131 | 9/1957 | McIntire | 23—277 R X |
| 2,071,721 | 2/1937 | Bagley et al. | 23—277 R X |

JAMES H. TAYMAN, Jr., Primary Examiner

U.S. Cl. X.R.

423—449; 23—262; 260—683 R, 679 R; 110—22 A, 22 R